United States Patent
Sun

[19]

[11] Patent Number: 5,921,599
[45] Date of Patent: Jul. 13, 1999

[54] SPADE HANDLE

[76] Inventor: Han-Chin Sun, 53 Lane 45, Tung An Rd., Tien Chung Town, Changhua, Taiwan

[21] Appl. No.: 08/878,116

[22] Filed: Jun. 18, 1997

[51] Int. Cl.⁶ .................. A01B 1/22; B25G 3/34
[52] U.S. Cl. .................... 294/57; 16/110 R; 403/265
[58] Field of Search .................. 294/49, 54.5, 57; 16/110 R, 116 R; 30/340, 342, 343; 81/177.1, 489, 492; 172/371, 378, 381; 403/265–269

[56] References Cited

U.S. PATENT DOCUMENTS

| | | | |
|---|---|---|---|
| 3,189,069 | 6/1965 | Stowell | 16/110 R X |
| 3,232,355 | 2/1966 | Woolworth | 294/57 X |
| 3,302,673 | 2/1967 | Forsberg | 16/116 R X |
| 5,213,014 | 5/1993 | Carmien | 294/57 X |
| 5,581,845 | 12/1996 | Yang | 16/110 R |
| 5,664,820 | 9/1997 | Carmien | 294/57 |

*Primary Examiner*—Johnny D. Cherry
*Attorney, Agent, or Firm*—Beveridge, DeGrandi, Weilacher & Young LLP

[57] ABSTRACT

A spade consists of a blade and a handle. The blade has an elongated shank. The handle is composed of a fastening tube and a casing for covering the fastening tube. The fastening tube has an axial hole in which the shank of the blade is securely located. The fastening tube is provided in the outer wall thereof with a plurality of ribs for retaining the casing.

1 Claim, 2 Drawing Sheets

SPADE HANDLE

FIELD OF THE INVENTION

The present invention relates generally to a gardening tool, and more particularly to a spade for digging the garden soil.

BACKGROUND OF THE INVENTION

The conventional spade is generally composed of a blade and a handle. The blade has a shank which is engaged with a fastening ring of the handle. The conventional spade is generally defective in design in that the handle is prone to become disengaged with the spade after a prolonged use of the spade.

SUMMARY OF THE INVENTION

The primary objective of the present invention is therefore to provide a spade with a handle which is securely fastened with the blade of the spade.

In keeping with the principle of the present invention, the foregoing objective of the present invention is attained by a spade, which consists of a blade and a handle. The blade has a shank which is of an elongated construction and is provided with a protruded portion, an enlarged portion, and a retaining hook located at the free end of the shank. The handle is composed of a fastening tube and a casing. The shank of the blade is retained securely in an axial hole of the fastening tube of the handle. The fastening tube is provided in the outer wall thereof with a plurality of fastening ribs for holding securely the casing.

The foregoing objective, features, and functions of the present invention will be more readily understood upon a thoughtful deliberation of the following detailed description of a preferred embodiment of the present invention with reference to the accompanying drawings.

DETAILED DESCRIPTION OF THE EMBODIMENT

Figure 1:
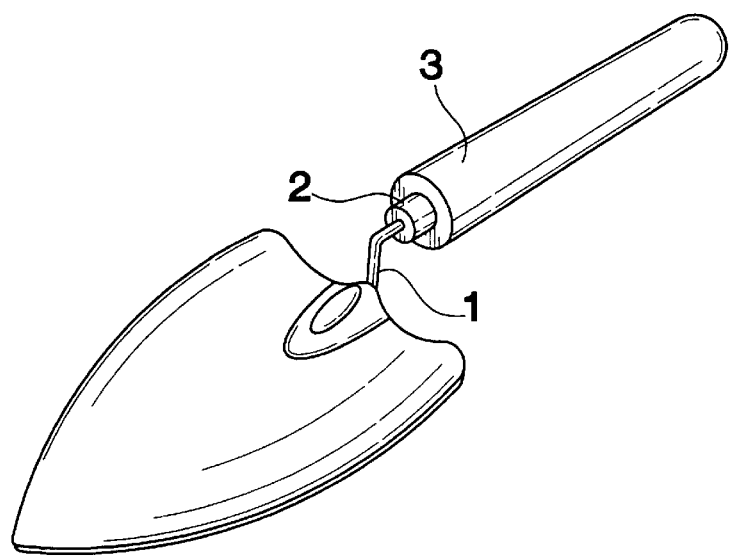
FIG. 1 shows a perspective view of a spade embodied in the present invention.
Figure 3:
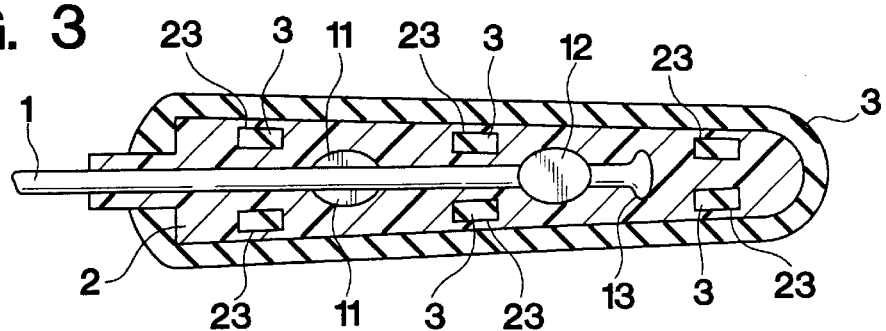
FIG. 3 shows a partial longitudinal sectional view of the handle of the present invention.
Figure 4:
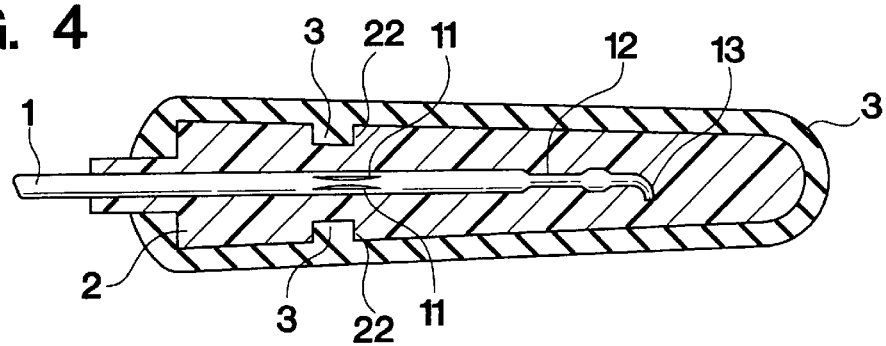
FIG. 4 shows another partial longitudinal sectional view of the present invention.
Figure 5:
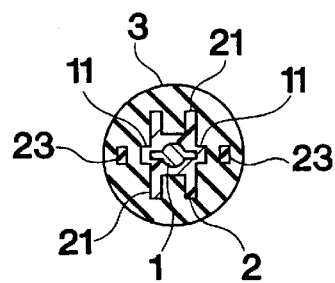
FIG. 5 shows a cross-sectional view of the present invention.
Figure 2A:
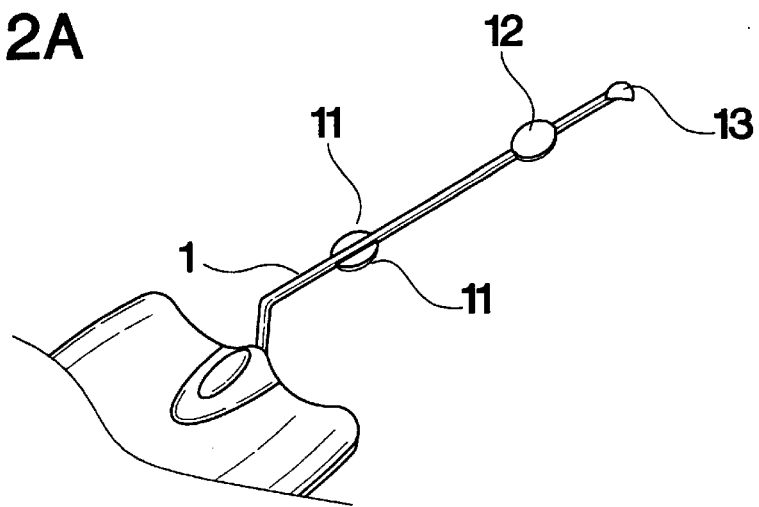
FIG. 2 is a schematic view illustrating the assembly of the spade of the present invention.
Figure 2B:
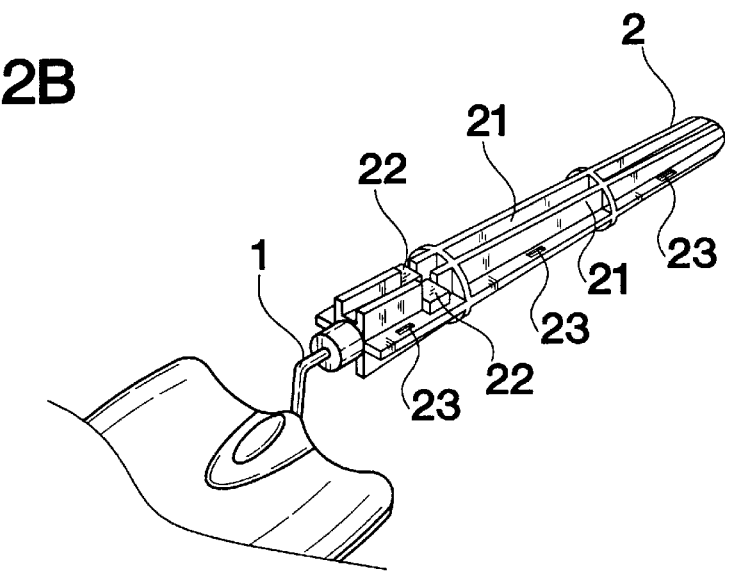
Figure 2C:
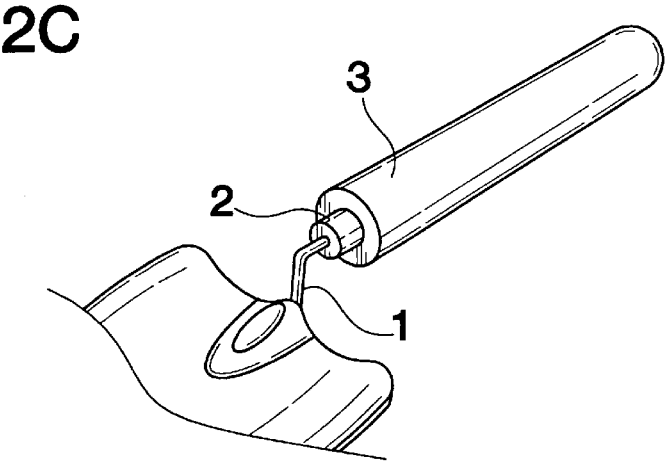

As shown in FIG. 1–5, a spade embodied in the present invention is composed of a blade having a shank 1, which is fastened with a fastening tube 2. The fastening tube 2 is enclosed by a casing 3. The fastening tube 2 and the casing 3 form together a handle of the spade.

As illustrated in FIG. 2–5, the fastening tube 2 is provided in the outer wall thereof with a plurality of retaining ribs 21 having a cut 22 and a plurality of holes 23. The fastening tube 2 is made of a rigid plastic material. The retaining ribs 21 of the fastening tube 2 serve to retain securely the casing 3 which is made of a soft plastic material.

The shank 1 of the blade is provided with a protruded portion 11, an enlarged portion 12, and a retaining hook 13 located at the free end of the shank 1. The shank 1 is received securely in the axial hole of the fastening tube 2.

The embodiment of the present invention described above is to be deemed as being merely illustrative and not restrictive. Accordingly, the present invention may be embodied in other specific forms without deviating from the spirit thereof. The present invention is therefore to be limited only by the scope of the following appended claim.

What is claimed is:

1. A spade comprising:

a blade having a shank of an elongated construction; and a handle fastened with said shank of said blade;

wherein said shank of said blade is provided with at least one enlarged portion and a retaining hook located at a free end of said shank;

wherein said handle is composed of a fastening tube and a casing covering said fastening tube, said fastening tube provided with an axial hole for engaging said shank of said blade, said fastening tube further provided in an outer wall thereof with a plurality of ribs for retaining said casing.

* * * * *